April 22, 1952 H. Z. GORA 2,593,438
METHOD AND MEANS FOR MOLDING ARTICLES
Filed Aug. 19, 1948 5 Sheets-Sheet 1

INVENTOR.
Henry Z. Gora
BY
Johnson and Kline
ATTORNEYS

April 22, 1952 H. Z. GORA 2,593,438
METHOD AND MEANS FOR MOLDING ARTICLES
Filed Aug. 19, 1948 5 Sheets-Sheet 3
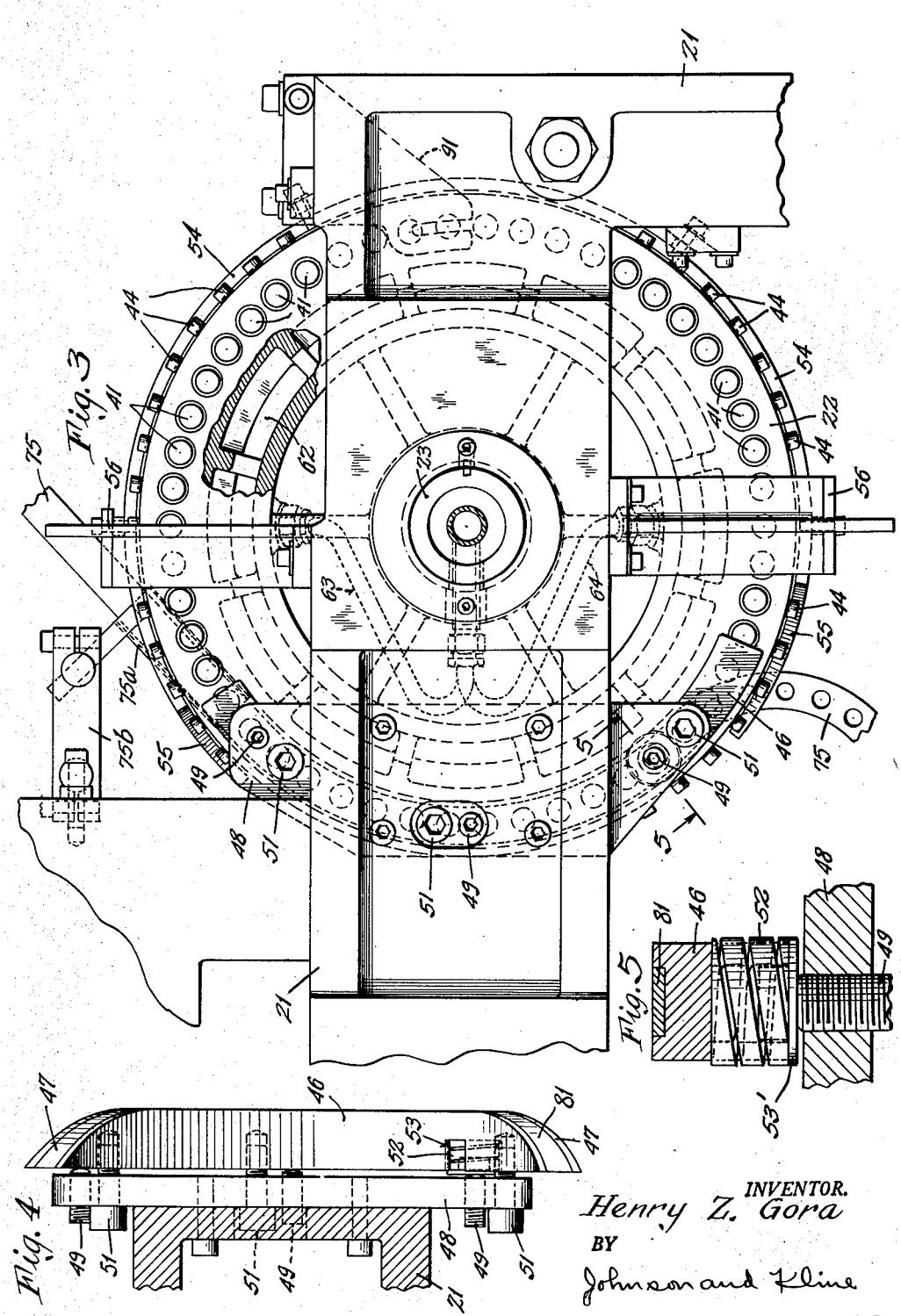
INVENTOR.
Henry Z. Gora
BY
Johnson and Kline
ATTORNEYS

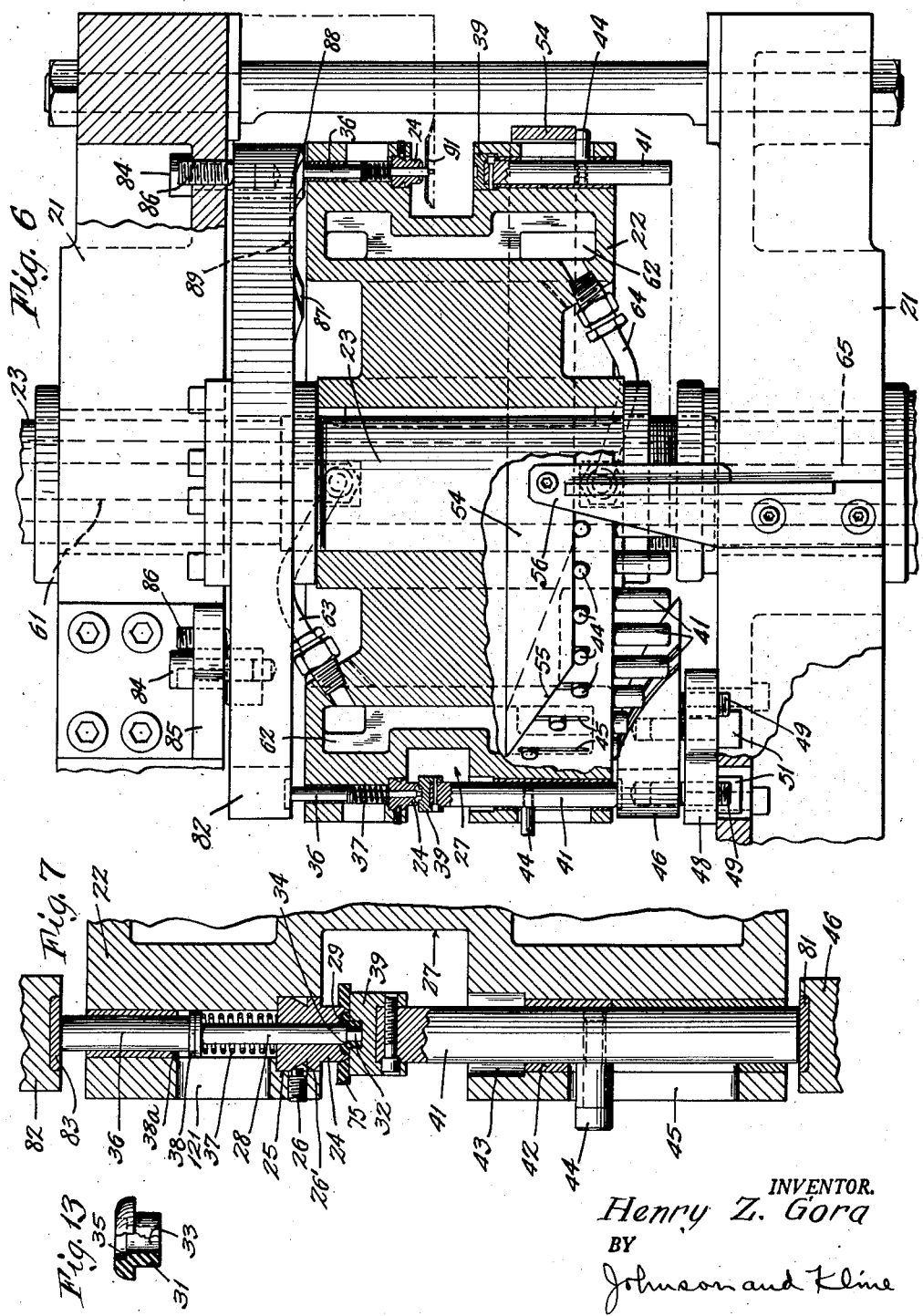

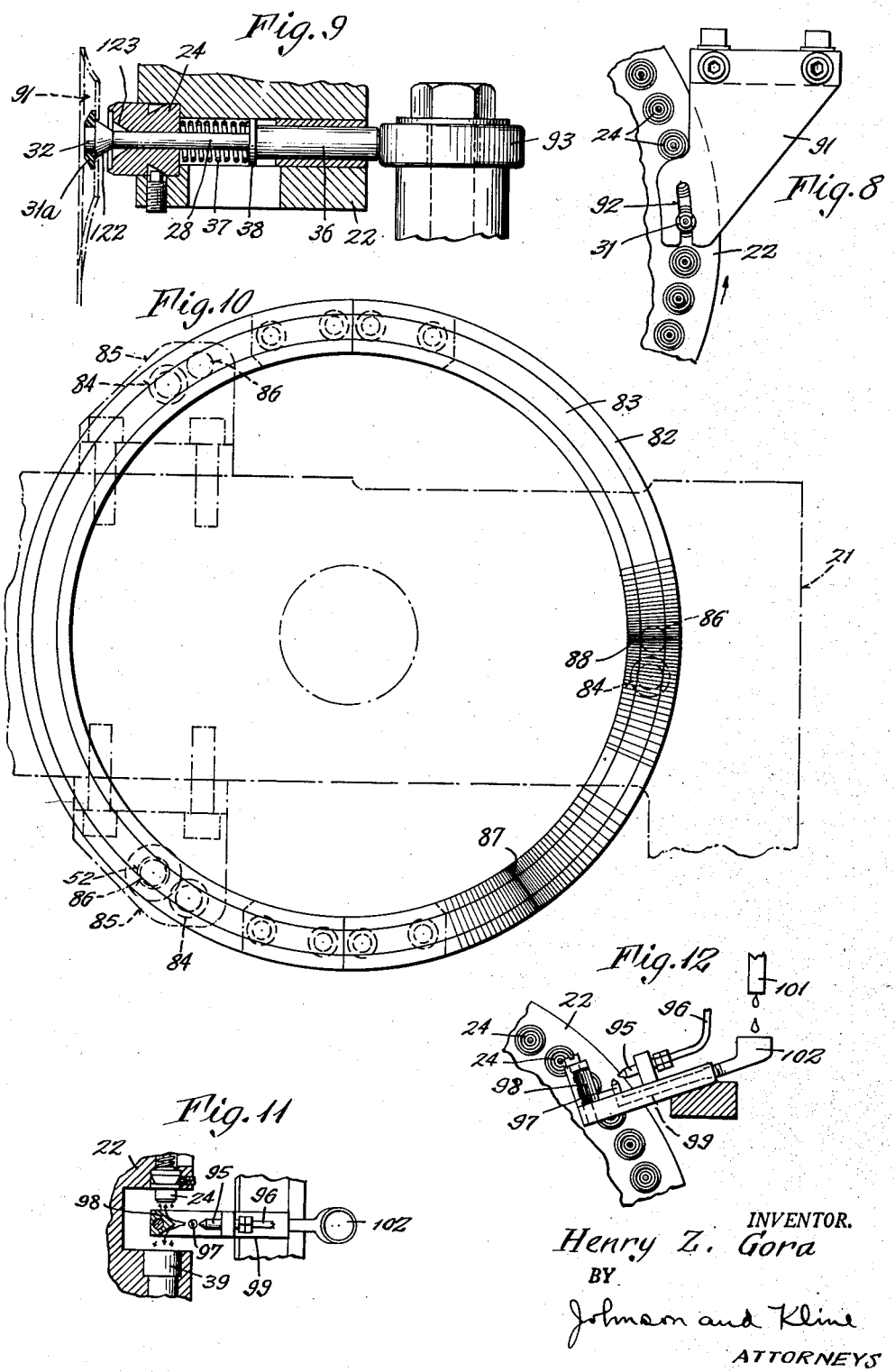

Patented Apr. 22, 1952

2,593,438

UNITED STATES PATENT OFFICE 2,593,438

METHOD AND MEANS FOR MOLDING ARTICLES

Henry Z. Gora, Stratford, Conn., assignor to The Gora-Lee Corporation, Stratford, Conn., a corporation of Connecticut Application August 19, 1948, Serial No. 45,051

13 Claims. (Cl. 18—20)

This invention relates to molding machines and methods particularly for continuously molding articles from a plastic material of suitable composition such, for example, as rubber or materials of a rubber-like nature.

In my co-pending application, Serial No. 642,193, filed January 19, 1946, now United States Patent 2,548,306, issued April 10, 1951, I have disclosed a species of my invention in which there is a continuous molding machine in which a pair of rotary drums support a series of cooperating molding dies around the drum peripheries in such an arrangement that upon rotation of the drums successive pairs of dies are brought together adjacent the point of tangency between the drums, to continuously cut and mold successive articles from a strip of moldable material which is continuously fed between the drums. In such a machine the cooperating dies are pressed together under a molding pressure only during a relatively short period, namely during travel through a very short arc of movement through the tangent point. As a result, the speed of rotation of the drums must be kept sufficiently low to press each pair of cooperating dies together for a period long enough to produce a satisfactory molded article, and this may seriously limit the productive capacity of the machine. Also, the closing and opening movements of the cooperating dies are on curved lines, which limits to some extent the sizes of the pieces which can be molded on a particular drum circumference.

A feature of this invention is the provision of a continuous molding machine constructed and arranged to be entirely free of such limitations.

A further feature is the provision of an improved method of continuously molding articles.

A further feature is the provision of a rotary type continuous molding machine constructed and arranged to provide such a relatively prolonged molding period as may be desired without limiting the speed of operation or the productive capacity of the machine.

A further feature is the provision of a machine of the rotary drum type in which the molding pressure between cooperating dies can be maintained at a maximum throughout substantially any desired extent of drum rotation.

A further feature is the provision of a rotary molding machine in which the closing and opening movements of the cooperating molding dies are on rectilinear lines.

A further feature is the provision of a molding machine of this type arranged to permit obtaining substantially any desired degree of molding pressure between cooperating dies for any desired molding period.

A still further feature is the provision of a rotary drum type of continuous molding machine having an increased productive capacity.

These and other features and advantages which will be apparent are accomplished by the invention hereinafter described. In the accompanying drawings—

Fig. 3 is a view in elevation on an enlarged scale, partly in section, of the rotary molding drum illustrated in Fig. 1;

Fig. 4 is a detailed view showing the die-closing cam plate;

Fig. 5 is a sectional view of a detail on the line 5—5 of Fig. 3;

Fig. 6 is a partial sectional view and partial plan view of the molding drum shown in Fig. 3;

Fig. 7 is a sectional view through a pair of cooperating molding dies as shown in Fig. 6, on an enlarged scale;

Fig. 8 is a view showing the stripper plate for stripping molded articles from the die ejector plunger;

Fig. 9 is a view showing a modified core pin and ejector plunger and one embodiment of an associated operating mechanism;

Fig. 10 is an elevation of an annular cam member which comprises another embodiment of an operating means for the combined core pin and ejector plunger;

Figs. 11 and 12 are top and side views in elevation showing the mechanism for delivering mold lubricant to the molding dies; and Fig. 13 is a partial section through a garter button illustrating one of the many articles which the present invention is adapted to produce continuously in large quantities.

Figure 1:
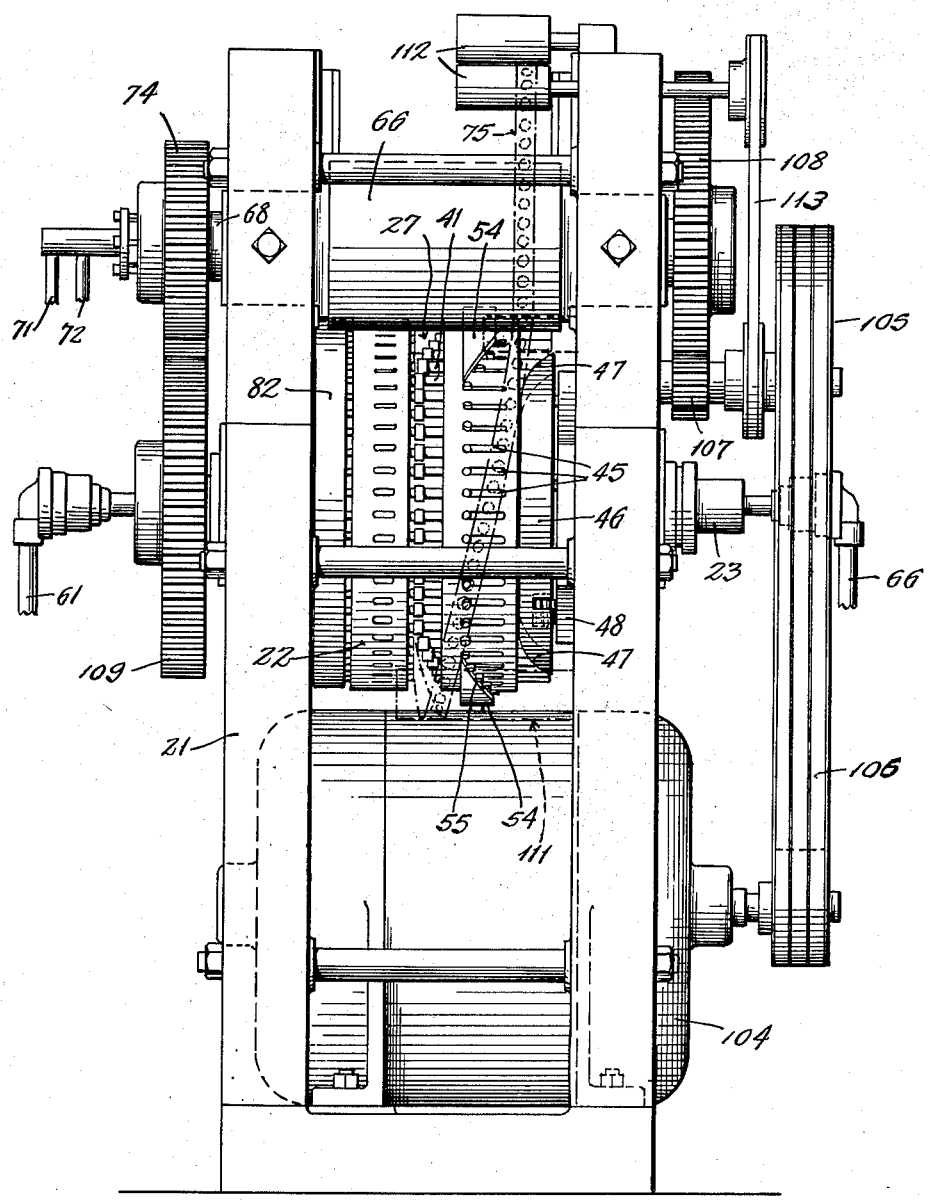
Figure 1 is an end elevation of a continuous molding machine constructed in accordance with one embodiment of the present invention.

In the present invention, a continuously rotating supporting means is provided for a series of cooperating cutting and molding dies which are preferably so mounted as to be relatively movable on the supporting means along substantially rectilinear lines. At a predetermined point in each revolution each pair of dies is closed upon moldable material placed between them, held close for a predetermined extended part of each revolution to subject the material to a maximum molding pressure for whatever period is desired, and then opened to permit ejection of the molded article. Assuming the rotational speed of the supporting means being more or less fixed by practical considerations, a molding period of any suitable or desired length can be provided without affecting the speed of rotation of the support, merely by properly locating the points at which the molding dies are closed and opened.

Preferably, a strip of moldable material, which may for example be a plasticized rubber compound, or other moldable material, is continuously fed between the cooperating dies as they rotate. The dies successively close on the strip to cut and mold articles therefrom and open at the end of the molding operation to permit ejection of the molded article. When the entire strip is not consumed, the skeletonized remainder is released by the opening of the dies and may be returned to a plasticizing mill substantially eliminating all waste as described, for example, in my said application. Each die is provided with a combined core pin and ejector plunger for ejecting the molded article which is usually unhardened and which can then be subjected to any further operations such as hardening or curing, trimming, tumbling or other treatment. When compounded rubber or similar material is being molded, it will be apparent that extending the molding period permits using a considerably wider range of compounding materials than is possible when a relatively short molding period is provided.

The illustrated embodiment of the invention is shown mounted upon a suitable supporting framework 21 and includes a rotary die-supporting means which is shown as a drum 22 keyed to a hollow rotary supporting shaft 23 rotatably supported in the machine frame. A series of pairs of stationary and movable molding dies is supported upon the drum on or adjacent its periphery. As illustrated, each pair of dies includes a stationary die member 24 secured in a die-receiving bore 25 by a clamping screw 26 on one side of a circumferential slot or groove 27 extending circumferentially around the perimeter of the drum 22. The clamping screw 26 engages an inclined face 26' on the die block to wedge the latter tightly into the bore 25. A combined core pin and ejector rod 28 extends through the die member 24 into a position centrally of the die cavity 29. The end of the pin 28 will vary in shape in accordance with the form of article being molded. Assuming, for the purposes of description, that a garter button 31 such as shown in Fig. 13 is being molded, the end of the pin 28 will be shaped as shown in Fig. 7 with a reduced projecting end 32 adapted to mold the bore 33 of the button and having a shoulder 34 adapted to form the countersunk opening 35 at one end of the bore 33. The combined core pin and ejector rod is connected to a plunger 36 which is slidable in and projects outwardly of the drum 22 for a purpose to be hereinafter described. The pin is normally yieldingly pressed into its retracted position by a helical spring 37 surrounding the pin between the bottom of the die block and a collar 38 formed on the plunger 36.

A relatively movable die member 39 is supported for closing and opening movement toward and from each stationary die member 24 on the opposite side of the drum slot 27 on a plunger 41 slidably mounted in a bore 42 having a mouth 43 of enlarged diameter adjacent the slot 27 to receive the die member 39 when the plunger 41 is retracted to open the dies. A pin 44 projects radially outward from the plunger 41 through a slot 45 in the face of the drum. Each movable die plunger 41 projects outwardly from the end of the bore 42 opposite the movable die 39. At a predetermined point in the rotation of the drum 22, each movable die 39 is successively moved inwardly into closed position shown in Fig. 7. A die-closing cam plate 46 is supported upon the frame 21 to successively close the molding dies at a predetermined point in the rotation of the drum 22, hold them closed for a sufficient part of the rotation of the drum to produce the desired molding pressure for the necessary period, and then permit opening thereof at the end of the molding period. The cam plate 46 is curved and has an inclined cam face 47 at each end. It is mounted upon a supporting plate 48 rigidly secured to the machine frame. The cam plate is so mounted upon the supporting plate 48 as to be sufficiently yieldable to accommodate slight variations in the lengths of different die plungers 41 resulting from manufacturing tolerances. As illustrated, see Fig. 4, threaded spacer studs 49 are adjustably mounted in the supporting plate 48, and the cam plate 46 is drawn against the ends of the spacer studs 49 by threaded bolts 51. The stud 49 adjacent the die-closing end of the cam plate 46, shown at the top of Figs. 3 and 4, as well as the studs located adjacent the center of the cam plate 46, bear directly against the face of the plate and form rigid supports at those points. However, a helical spring 52 seating in a bore 53 in the cam plate, is interposed between the plate and the spacing stud 49 adjacent the opposite end of the cam plate, a spring seating plate 53' being interposed between the stud and the adjacent end of the spring 52. This arrangement provides sufficient flexibility in the mounting of the cam plate to accommodate movable die plungers 41 having variations in their length. Obviously, any desired degree of molding pressure can be obtained between the cooperating die members by suitable adjustment of the die-closing cam plate 46.

With a given speed of travel of the molding dies, the length of the cam plate 46 which fixes the points at which the molding dies are closed and opened in their travel, will determine the length of the molding period.

A die-opening cam 54 having a bevelled cam face 55 at each end is mounted on supporting brackets 56 and surrounds the die-supporting drum 22 in position to engage the radial pins 44 on the movable die plungers 41. The die-closing plate 46 and the die-opening cam 54 are so positioned relatively to each other that the ends of the plunger 41 are engaged by the closing cam 46, see Fig. 6, at the point where rotation of the drum moves the pins 44 out of contact with the opening cam 54 and the opening cam 54 engages the pins 44 toward the bottom of the drum, see Fig. 3, at that point where the plungers 41 move off the closing cam 46.

Figure 2:
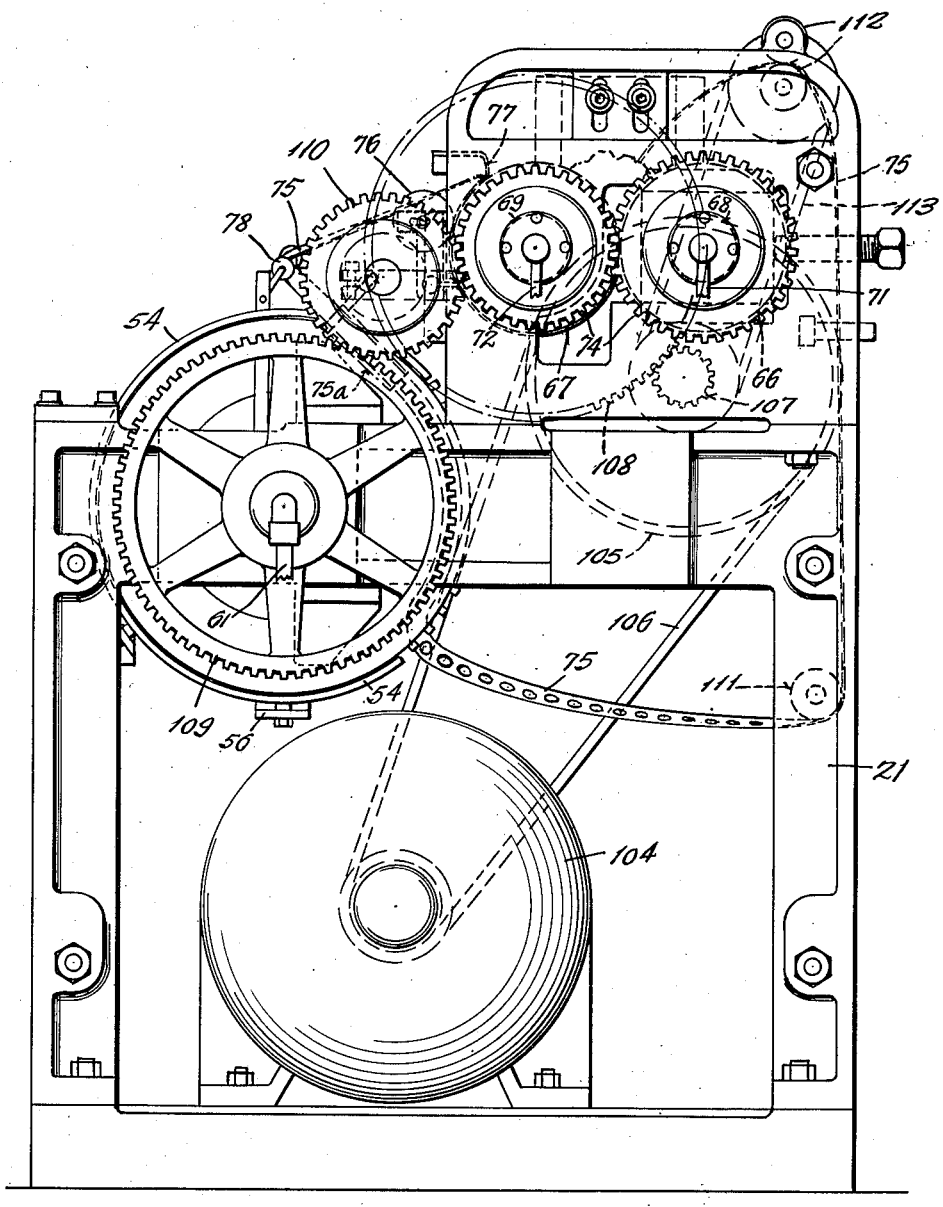
Fig. 2 is a side elevation looking from the left of Fig. 1.

The drum may be chambered to be heated or cooled by any suitable fluid such, for example, as steam or cold water delivered to the interior of the hollow supporting shaft from a steam line 61, see Figs. 1 and 2. An annular chamber 62 is formed in the drum adjacent the periphery thereof and the control fluid is delivered thereto on one side of the drum through a connection 63 communicating with the steam pipe 61 through the hollow supporting shaft. An outlet pipe 64 connects the opposite side of the chamber 62 with a bore 65 connected to a return line 66, see Fig. 1. The molding dies are thus heated or cooled by conduction through the supporting drum 22.

In the machine illustrated, a strip of moldable material is continuously fed into position between the molding dies to have material cut therefrom by closing the dies upon the strip which moves with the dies during a part of their rotation. For this purpose, the illustrated machine includes a mill comprising a pair of mill rollers 66, 67 supported in the upper part of the frame 21 on parallel rotary shafts 68, 69, the temperature of the rollers being controlled by fluid delivered thereto through lines 71, 72 in the usual way. Gears 74 connect the mill rolls for simultaneous rotation, one of said gears being of larger pitch diameter than the other so that the rotational speeds of the two rolls are slightly different to increase the milling effect of the rolls. A strip 75 of plasticized moldable material is continuously removed from the roll 67 by a pair of cutters 76 and a scraper 77. The strip is led over an idler guide roll 78 positioned at an angle to assist in turning the strip so that it can be fed into the drum slot 27 between the cooperating dies in a radially edgewise position, see Figs. 6 and 7. A strip guiding funnel or the like 75a is supported upon a bracket 75b and directs the strip into position between the open dies at a point of rotation thereof just in advance of the closing cam 46, in a direction tangent to the circle including the die axes, and at a speed equal to the rotational speed of the dies. As the drum rotates, the die-closing cam 46 successively engages the die plungers 41 to successively close the dies on the strip 75 which thus becomes impaled on the dies, a portion of the material being cut and pressed between the dies in the manner indicated in Fig. 7 which illustrates the molding of a garter button. The strip moves with the dies during the molding operation in which dies are held closed by the cam 46 on which the ends of the die-closing plungers 41 ride. A wear plate 81 is provided in the face of the closing cam. At the end of the molding operation, the die plungers 41 ride off the closing cam 46, see Fig. 1, and the cam face 55 of the opening cam strip 54 successively engages the radial pins 44 retracting the die plungers 41 and opening the dies 24, 39 so as to permit subsequent ejection of the molded article from the stationary dies 24, and at the same time freeing the skeletonized strip 75.

The combined core pin and ejector rod 28 forms a core for molding annular articles. For example, when a button of the type shown in Fig. 13 is molded, the rod 28 is held in the position shown in Fig. 7 by a positioning ring 82 having a wear plate 83 engaging the projecting end of the core pin plungers 36. The position of the rod 28 during the molding operation is fixed by the adjustment of the ring 82 which is mounted on supporting studs 84 extending through bracket members 85 and threaded into the ring 82 so as to draw the latter tightly against threaded spacer studs 86, see Fig. 6. The positioning ring 82 is provided with ejector cam faces 87 and 88, which are so formed as to operate the rod 28 as an ejector in a manner to free the molded articles from the die 24 and from the rod 28 itself. Adjacent the cam face 87 the ring is backed by a spring mechanism similar to that supporting the closing cam 46 and illustrated in Fig. 5, so as to accommodate plungers 36 of varying lengths due to manufacturing tolerances. As the dies successively approach the ejecting station, as shown at the right of Fig. 6, the cam 87 moves each rod 28 outwardly of the associated die 24 so as to free the molded article from adherence to the die cavity 29. Thereafter, a depression 89 in the ring 82 permits each plunger spring 37 to retract the rods 28 beyond the position occupied during the molding operation so as to free the molded article from adherence to the projecting end or core end of the rods 28. Thereafter, the cam face 88 engages the plungers 36 to again move the ejector rods outwardly and support the molded article in position spaced outwardly of the die cavity 29 to be engaged by a stripping plate 91 by which the finished articles are stripped from the ends of the rods 28. As shown in Figs. 8 and 9, a stripper plate 91 has a slot 92 in an end of the plate located at such angle that the rods 28 pass through the slot and the molded, unhardened articles are successively stripped off. When the article being molded is formed with a straight bore without the countersunk opening 35, the core pin will be retracted into the die cavity by the spring 37 to the farthest point possible in which the collar 38 engages the adjacent face 38a at the end of the plunger receiving bore. In this position, the surface of the shoulder 34 on the end of the core pin coincides with the bottom face of the die cavity and only the reduced end 32 functions as a molding die core. Such an arrangement will be employed in making various types of annular buttons and the like. With this arrangement, the ring 82 can be entirely eliminated and a single ejector-actuating roller 93, such as shown in Fig. 9, mounted in position to project the rod 28 outwardly so that the stripper plate 91 can strip the molded article from the end of the rod.

Mechanism is provided for supplying lubricant to the molding dies. As illustrated in Figs. 11 and 12, this includes a nozzle 95 connected to an air supply line 96 for blowing a blast of air across the nose of a lubricant supply pipe 97 against the pointed edge of a bevelled lubricant spreader 98 which directs the lubricant laden air stream in opposite directions into the cavities of the spaced molding dies on each side thereof. Lubricant is delivered to the pipe 97 by gravity through an inclined connecting pipe 99 receiving lubricant from a supply line 101, which delivers it by a slow regulated flow to a receiving cup 102 communicating with the pipe 99.

Any suitable source of power can be employed for operating the machine and rotating the drum. In the illustrated embodiment, an electric motor 104 drives a pulley 105 through belt 106, a spur gear 107 on the pulley shaft driving a large gear 108 on one of the plasticizing drum roll shafts, the latter shafts being connected by the gears 74 above described. A drum driving gear 109 is driven through an idler 110 from one of the plasticizing mill gears 74. Substantially all waste of moldable material is avoided by returning the unused part of the strip 75 to the batch of material in the plasticizing mill for reincorporation therewith.

As herein illustrated, the skeletonized strip 75 after being released by the molding dies is passed over an idler roller 111, see Fig. 2, and is then passed between a pair of return rollers 112 driven from the pulley shaft by a belt drive 113 and thereby returned to the batch of material in the plasticizing mill for reincorporation therein.

During operation of the machine and molding of the buttons 31 by the core piece 28, as shown in Fig. 7, minute quantities of material from the strip 75 may escape along the pins 28 into the area occupied by the springs 37. To enable this material to be discharged without interfering with the machine operation, discharge openings 121 are provided in the drum as shown in Fig. 7.

In order to prevent the escape of such material along the pin 28 in manufacturing small washers, as illustrated in Fig. 9, the pin adjacent the end 32 is provided with a tapered portion 122 adapted to seat in a correspondingly shaped cavity 123 in the end of the die member 24. This arrangement effectively prevents the escape of minute particles of material along the pins 28.

It will be apparent that the present invention provides all the advantages of a rotary drum continuous molding machine while operating the molding dies on rectilinear lines and avoiding the disadvantages which are encountered when the dies are brought together along curved lines. The molding period can be extended for substantially any reasonable part of a complete revolution of the drum 22 by proper proportioning of the die-closing and opening cams without retarding the speed of operation which can be maintained at a maximum, and the molding pressure can be maintained at its maximum during the entire molding period.

Obviously, the invention can be variously modified and adapted and portions of the improvements can be used without others.

I claim:

1. A molding machine comprising a movable die support, a series of cooperating molding dies mounted on said support for movement therewith, means located between the paths of movement of said cooperating dies for supplying lubricant thereto, including a lubricant delivering nozzle, means for directing an air stream across said nozzle for collecting lubricant therefrom, and means for dividing the lubricant carrying air stream and directing it to said cooperating dies to deposit lubricant therein.

2. A machine for continuously molding articles comprising a rotatable die supporting drum, a series of relatively stationary molding die members mounted on said drum, a series of cooperating molding die members mounted on said drum for movement along rectilinear lines relatively to said stationary die members, said die members having opposed molding die-faces; plungers supporting said movable die members and projecting outwardly from said drum; means actuated by said rotation of said drum for successively causing said movable die members to move toward said stationary die members to successively mold articles from material placed therebetween including an arcuate cam member adapted to engage the ends of said plungers upon rotation of said drum; means supporting said cam member including an adjustable abutment; means for holding said cam bar in engagement with said abutment, a yieldable abutment spaced from said adjustable abutment; and means for holding said cam bar in engagement with said yieldable abutment.

3. A molding machine comprising a rotatable drum, a stationary molding die mounted on said drum, a core forming ejector rod movably positioned in said stationary die; means for holding said rod in predetermined core forming position in said die during a molding operation; means for molding an article in said die around said rod; means for shifting said rod outwardly of said die to free the molded article from adhesion to said die; means for retracting said rod sufficiently to free the article from adhesion thereto; and means for thereafter projecting said rod outwardly of said die to expel the article therefrom.

4. A molding machine comprising a rotatable drum, a stationary molding die mounted on said drum, a core forming ejector rod movably positioned in said stationary die; means for holding said rod in predetermined core forming position in said die during a molding operation; means for molding an article in said die around said rod; means for shifting said rod outwardly of said die to free the molded article from adhesion to said die; means for retracting said rod sufficiently to free the article from adhesion thereto; means for thereafter projecting said rod outwardly of said die; and means for stripping the molded article from said projecting rod.

5. The herein described method which comprises continuously travelling a succession of opposed aligned die members in a single closed path; preparing a continuous strip of plasticized moldable material of greater width than said die members; guiding said strip tangentially into an arc of travel of the die members and between opposed advancing die members at a predetermined place in said travel; there closing aligned die members on the interposed strip and bringing the die members axially together to cause them to pierce through the strip between its side edges and blank-out a piece of desired shape and size from the strip; maintaining the die members closed for a predetermined travel thereof with the strip impaled on the closed die members and travelling therewith and with the blanked-out piece contained within the die members; thereafter opening the die members; and guiding the blanked-out strip from between said die members to release the strip therefrom.

6. The herein described method which comprises continuously travelling a succession of opposed aligned die members in a single closed path; preparing a continuous strip of plasticized moldable material of greater width than said die members; guiding said strip tangentially into an arc of travel of the die members and between opposed advancing die members at a predetermined place in said travel, closing successive aligned die members on the interposed strip and bringing the die members axially together to cause them to pierce through the strip between its side edges and blank-out pieces of desired shape and size from successive portions of the strip; maintaining a plurality of opposed die members closed each for a predetermined travel thereof with the strip impaled on the closed die members and travelling arcuately therewith and with the blanked-out pieces contained within the die members; successively opening the die members at a predetermined point in their travel; and guiding the blanked-out strip from between said opened die members to release the strip therefrom.

7. The herein described method which comprises continuously travelling a succession of opposed die members in a closed path; plasticizing moldable material and producing therefrom a continuous strip of greater width than said die members; guiding said strip tangentially into an arc of travel of the die members and between opposed advancing die members at a predetermined place in said travel; there closing the die members on the interposed strip and bringing the die members together to cause them to pierce through the strip between its side edges and blank-out a piece of desired shape and size from the strip; maintaining the die members closed for a predetermined travel thereof with the strip impaled on the closed die members and travelling therewith and with the blanked-out piece contained within the die members; thereafter opening the die members; guiding the blanked-out strip from between said die members to release the strip therefrom; and leading the blanked-out strip away from the path of travel of said die members and commingling it with the plasticized material from which said strip is initially produced.

8. The herein described method which comprises continuously travelling a succession of opposed die members in a closed path; plasticizing moldable material and producing therefrom a continuous strip of greater width than said die members; guiding said strip tangentially into an arc of travel of the die members and between opposed advancing die members at a predetermined place in said travel; there closing the die members on the interposed strip and bringing the die members together to cause them to pierce through the strip between its side edges and blank-out pieces of desired shape and size from the strip, the strip being left unsevered; maintaining the die members closed for a predetermined travel thereof with the strip impaled on the closed die members and travelling therewith and with the blanked-out piece contained within the die members; removing the strip from the die members; guiding the blanked-out strip from between said die members to release the strip therefrom; and leading the blanked-out strip away from the path of travel of said die members and commingling it with the plasticized material from which said strip is initially produced.

9. The herein described method which comprises continuously travelling a succession of sets of opposed aligned die members in a closed path; preparing a continuous strip of plasticized moldable material of greater width than said die members; guiding said strip tangentially into an arc of travel of the die members and between a set of opposed advancing die members at a predetermined place in said travel; there closing said set of die members on the interposed strip and bringing the die members together to cause them to pierce through the strip between its side edges and blank out a piece of desired shape and size from the strip; at said place closing the succeeding set of advancing die members on the interposed strip to pierce the strip and blank out therefrom another piece of desired shape and size, while the preceding set of die members still is closed on the interposed strip whereby said strip remains impaled on the closed sets of die members and travels therewith in its arc of travel with the blanked-out pieces contained within the die members; then successively opening the sets of die members; and guiding the blanked-out strip from between said die members to release the strip therefrom.

10. Apparatus for continuously forming pieces of desired shape and size comprising a rotatable die support; a series of sets of opposed, aligned blanking-out die members mounted on said support and travelling therewith in a closed path; means for preparing a continuous strip of plasticized moldable material of greater width than said die members; guide means to interpose said strip tangentially into an arc of travel of the die members and between a set of aligned die members at a predetermined place in said travel; means to close the aligned die members of a set axially on the interposed strip to blank out therefrom a piece of desired shape and size, said die-closing means maintaining the die members of said set closed for a predetermined arc of travel thereof with the blanked-out piece contained within the die members, at least one die of each set of opposed dies being shaped to pierce said strip whereby the strip is impaled thereon and travels therewith; means to open the die members; and guide means to lead the blanked-out strip from between said die members.

11. Apparatus for continuously forming pieces of desired shape and size comprising a rotatable die support; a series of sets of opposed, aligned blanking-out die members mounted on said support and travelling therewith in a closed path; means for preparing a continuous strip of plasticized moldable material of greater width than said die members; guide means to interpose said strip tangentially into an arc of travel of the die members and between a set of aligned die members at a predetermined place in said travel; means to close the aligned die members of a set axially on the interposed strip to blank out therefrom a piece of desired shape and size, said die-closing means maintaining the die members of said set closed for a predetermined arc of travel thereof with the blanked-out piece contained within the die members, at least one die of each set of opposed dies being shaped to pierce said strip whereby the strip is impaled thereon and travels therewith; means to open the die members; guide means to lead the blanked-out strip from between said die members, said piece being retained by one die member; and means for thereafter discharging the piece from said die member.

12. Apparatus for continuously forming pieces of desired shape and size comprising a rotatable drum; a series of sets of opposed, aligned blanking-out die members mounted on said drum and travelling therewith in a closed path; means for preparing a continuous strip of plasticized moldable material of greater width than said die members; guide means to interpose said strip tangentially into an arc of travel of the die members and between a set of aligned die members at a predetermined place in said travel; cam means to close the aligned die members of a set rectilinearly on the interposed strip to blank out and form therefrom a piece of desired shape and size, said cam means maintaining the die members of said set closed for a predetermined arc of travel thereof with the blanked-out piece contained within the die members, at least one of each set of opposed dies being shaped to pierce said strip whereby the strip is impaled thereon and travels therewith; cam means to open the die members; and guide means to lead the blanked-out strip from between said die members.

13. Apparatus for continuously forming pieces of desired shape and size comprising a rotatable die support; a series of sets of opposed, aligned blanking-out die members mounted on said support and travelling therewith in a closed path; means for preparing a continuous strip of plasticized moldable material of greater width than said die members; guide means to interpose said strip tangentially into an arc of travel of the die members and between a set of aligned die members at a predetermined place in said travel; means to close the aligned die members of a set axially on the interposed strip to pierce and blank out therefrom a piece of desired shape and size, said die-closing means maintaining the die members of said set closed for a predetermined arc of travel thereof with the blanked-out piece contained within the die members until at least the succeeding set of die members has closed on the strip to pierce and blank out therefrom another piece of desired shape and size, whereby the strip is impaled on the closed sets of die members and is guided in an arc of travel therewith; means to successively open the closed sets of die members; and guide means to lead the blanked-out strip out from between the opened sets of die members.

HENRY Z. GORA.

REFERENCES CITED

The following references are of record in the file of this patent:

UNITED STATES PATENTS

| Number | Name | Date |
|---|---|---|
| 431,117 | Knickerbocker | July 1, 1890 |
| 534,446 | Miller | Feb. 19, 1895 |
| 784,083 | Treadwell | Mar. 7, 1905 |
| 1,026,682 | Komarek | May 21, 1912 |
| 1,750,708 | Edwards | Mar. 18, 1930 |
| 1,846,999 | Eaton | Feb. 23, 1932 |
| 1,965,732 | Bisterfeld | July 10, 1934 |
| 2,027,915 | Kux | Jan. 14, 1936 |
| 2,157,467 | Thurlings | May 9, 1939 |
| 2,218,527 | De Wyk et al. | Oct. 22, 1940 |
| 2,230,189 | Ferngren | Jan. 28, 1941 |
| 2,260,456 | Johnson | Oct. 28, 1941 |
| 2,297,741 | Bruner | Oct. 6, 1942 |
| 2,354,029 | Kingston | July 18, 1944 |
| 2,456,697 | Gruenwald | Dec. 21, 1948 |